(12) United States Patent
Wang et al.

(10) Patent No.: US 9,847,817 B2
(45) Date of Patent: *Dec. 19, 2017

(54) METHOD, USER EQUIPMENT AND BASE STATION FOR DETERMINING PRECODING MATRIX INDICATOR

(71) Applicant: Huawei Technologies Co., Ltd., Shenzhen (CN)

(72) Inventors: Jianguo Wang, Bonn (DE); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

This patent is subject to a terminal disclaimer.

(21) Appl. No.: 14/931,284

(22) Filed: Nov. 3, 2015

(65) Prior Publication Data

US 2016/0056873 A1    Feb. 25, 2016

Related U.S. Application Data

(63) Continuation of application No. 14/588,755, filed on Jan. 2, 2015, now Pat. No. 9,209,877, which is a
(Continued)

(51) Int. Cl.
    *H04B 7/04*    (2017.01)
    *H04L 1/06*    (2006.01)
    *H04W 72/04*   (2009.01)

(52) U.S. Cl.
    CPC ......... *H04B 7/0465* (2013.01); *H04B 7/0478* (2013.01); *H04L 1/06* (2013.01); *H04W 72/042* (2013.01); *H04W 72/046* (2013.01)

(58) Field of Classification Search
    CPC ....... H04B 7/0465; H04B 7/0478; H04L 1/06; H04W 72/042; H04W 72/046
    See application file for complete search history.

(56) References Cited

U.S. PATENT DOCUMENTS

| 9,548,803 B2 * | 1/2017 | Tee ...................... H04B 7/0695 |
| 2003/0073464 A1 * | 4/2003 | Giannakis ............. H04L 1/0618 |
| | | 455/562.1 |

(Continued)

FOREIGN PATENT DOCUMENTS

| CN | 102006145 A | 4/2011 |
| CN | 102130752 A | 7/2011 |
| CN | 102158315 A | 8/2011 |

OTHER PUBLICATIONS $1^{st}$ Office Action in corresponding U.S. Appl. No. 14/588,755 (dated Apr. 17, 2015).

(Continued)

*Primary Examiner* — Ajay Cattungal
(74) *Attorney, Agent, or Firm* — Leydig, Voit & Mayer, Ltd.

(57) ABSTRACT

The present disclosure discloses a method, a user equipment and a base station for determining a PMI. The method includes: receiving a reference signal set sent by a base station; based on the reference signal set, selecting a precoding matrix from a codebook, the codebook at least including a non-constant modulus precoding matrix, the non-constant modulus precoding matrix at least including a non-constant modulus column vector, amplitude values of at least two elements of the non-constant modulus column vector forming a symmetrical sequence; and sending a PMI to the base station, the PMI corresponding to the selected precoding matrix. According to the method, the user equipment and the base station for determining PMI, because the non-constant modulus precoding matrix included in the adopted codebook can adjust the shape of a beam, antennas may focus power on a hotspot region, and thus a load balance may be effectively realized.

20 Claims, 2 Drawing Sheets

Related U.S. Application Data continuation of application No. PCT/CN2012/078020, filed on Jul. 2, 2012.

(56) References Cited

U.S. PATENT DOCUMENTS

| | | | |
|---|---|---|---|
| 2005/0220200 A1* | 10/2005 | Giannakis | H04L 5/023 375/260 |
| 2008/0285667 A1* | 11/2008 | Mondal | H04B 7/0417 375/260 |
| 2008/0303699 A1* | 12/2008 | Zhang | H04L 25/0204 341/67 |
| 2010/0067605 A1 | 3/2010 | Jongren | |
| 2011/0243079 A1* | 10/2011 | Chen | H04B 7/063 370/329 |
| 2012/0039369 A1 | 2/2012 | Choi et al. | |
| 2012/0163439 A1* | 6/2012 | Zhou | H04B 7/0417 375/224 |
| 2014/0064394 A1* | 3/2014 | Wang | H04B 7/0456 375/267 |
| 2014/0072068 A1* | 3/2014 | Zhu | H04B 7/024 375/267 |
| 2014/0105317 A1 | 4/2014 | Erell et al. | |
| 2014/0334571 A1 | 11/2014 | Wang et al. | |
| 2014/0355529 A1* | 12/2014 | Zhu | H04N 21/2365 370/329 |

* cited by examiner

METHOD, USER EQUIPMENT AND BASE STATION FOR DETERMINING PRECODING MATRIX INDICATOR

CROSS-REFERENCE TO RELATED APPLICATIONS

This application is a continuation of U.S. patent application Ser. No. 14/588,755, filed on Jan. 2, 2015, which is a continuation of International Patent Application No. PCT/CN2012/078020, filed on Jul. 2, 2012. The afore-mentioned patent applications are hereby incorporated by reference in their entireties.

TECHNICAL FIELD

The present disclosure relates to the field of communications, and in particular, to methods, user equipments and base stations for determining a precoding matrix indicator.

BACKGROUND

Through a transmit beamforming (Beam Forming, "BF" for short) or precoding technology, a multiple input multiple output (Multiple Input Multiple Output, "MIMO" for short) wireless system may obtain diversity and array gain. A typical system using BF or precoding generally may be denoted as y=HWs+n, wherein y is a received signal vector, H is a channel matrix, W is a precoding matrix, s is a transmitted signal vector, and n is a measurement noise and interference.

An optimal precoding generally needs a transmitter to completely know channel state information (Channel State Information, "CSI" for short). As in a common method, a user equipment (User Equipment, "UE" for short) quantizes instantaneous CSI and feeds back the quantized CSI to a base station (evolved Node B, eNB). The CSI information fed back in the existing long term evolution (Long Term Evolution, "LTE" for short) release 8 (Release 8, "R8" for short) system includes a rank indicator (Rank Indicator, "RI" for short), a precoding matrix indicator (Precoding Matrix Indicator, "PMI" for short) and channel quality indicator (Channel Quality Indicator, "CQI" for short) etc, wherein the RI and the PMI indicate the number of layers and a precoding matrix used respectively. Generally, a set of precoding matrices is referred to as a codebook or a precoding codebook, and each precoding matrix in the codebook is referred to as a code word.

To reduce system cost, achieve higher system capacity and meet coverage requirement meanwhile, an active antenna system (Active Antenna System, "AAS" for short) is already widely deployed in practice. AAS is being considered to be introduced into an LTE release 12 (Release 12, "R12" for short) standard to be started at present, so as to enhance the communication performance of the system. In AAS (AAS) system, a transceiver is directly connected with antenna elements, and the amplitude and phase of each antenna element may be directly adjusted, so that not only beam direction but also beam shape can be adjusted.

With the development of data services, particularly the appearance of a hotspot region in a heterogeneous network, a network system is required to adapt to a unbalanced network load. For example, better power is provided for the hotspot region, etc. The AAS provides a beneficial manner for solving the load imbalance issues, so as to focus the power on the hotspot region and reduce the interference on a non-hotspot region at the same time.

However, the present LTE R8 system adopts a single codebook, wherein the 4-antenna codebook is designed on the basis of a Householder transformation, and each element of a precoding matrix in the codebook has the same amplitude, namely satisfies constant modulus property, so that the precoding matrix can only adjust the beam direction but can not adjust the beam shape. LTE release 10 (Release 10, "R10" for short) system further introduces a double-codebook design for 8 antennas, but the precoding matrix included in double codebooks can also only adjust beam direction but can not adjust beam shape.

Therefore, the above-mentioned codebooks can not enable a communication system to realize a load balance.

SUMMARY

Embodiments of the present disclosure provide methods, user equipments and base stations for determining a precoding matrix indicator. A non-constant modulus precoding matrix included in an adopted codebook can adjust beam shape, so that a communication system may effectively realize a load balance.

In one aspect, an embodiment of the present disclosure provides a method for determining a precoding matrix indicator, including: receiving a reference signal set sent by a base station; based on the reference signal set, selecting a precoding matrix from a codebook, the codebook at least including a non-constant modulus precoding matrix, the non-constant modulus precoding matrix at least including a non-constant modulus column vector, amplitude values of elements of the non-constant modulus column vector forming a symmetrical sequence, and a length of the sequence being not smaller than 2 and not greater than the number of dimensions of the non-constant modulus column vector; and sending a precoding matrix indicator to the base station, the precoding matrix indicator corresponding to the selected precoding matrix.

In another aspect, an embodiment of the present disclosure provides a method for determining a precoding matrix indicator, including: sending a reference signal set to a user equipment; receiving a precoding matrix indicator sent by the user equipment, the precoding matrix indicator corresponding to a precoding matrix selected from a codebook by the user equipment based on the reference signal set, the codebook at least including a non-constant modulus precoding matrix, the non-constant modulus precoding matrix at least including a non-constant modulus column vector, amplitude values of elements of the non-constant modulus column vector forming a symmetrical sequence, and a length of the sequence being not smaller than 2 and not greater than the number of dimensions of the non-constant modulus column vector.

In a further aspect, an embodiment of the present disclosure provides a user equipment, including: a receiving module, configured to receive a reference signal set sent by a base station; a selecting module, configured to, based on the reference signal set received by the receiving module, select a precoding matrix from a codebook, the codebook at least including a non-constant modulus precoding matrix, the non-constant modulus precoding matrix at least including a non-constant modulus column vector, amplitude values of elements of the non-constant modulus column vector forming a symmetrical sequence, and a length of the sequence being not smaller than 2 and not greater than the number of dimensions of the non-constant modulus column vector; and a sending module, configured to send a precoding matrix indicator to the base station, the precoding matrix indicator corresponding to the precoding matrix selected by the selecting module.

In a still further aspect, an embodiment of the present disclosure provides a base station, including: a sending module, configured to send a reference signal set to a user equipment; a receiving module, configured to receive a precoding matrix indicator sent by the user equipment, the precoding matrix indicator corresponding to a precoding matrix selected from a codebook by the user equipment based on the reference signal set, the codebook at least including a non-constant modulus precoding matrix, the non-constant modulus precoding matrix at least including a non-constant modulus column vector, amplitude values of elements of the non-constant modulus column vector forming a symmetrical sequence, and a length of the sequence being not smaller than 2 and not greater than the number of dimensions of the non-constant modulus column vector.

Based on the above technical solutions, according to the methods, the user equipments and the base stations for determining the precoding matrix indicator provided in the embodiments of the present disclosure, the precoding matrix is determined from the codebook with the non-constant modulus precoding matrix, and the non-constant modulus precoding matrix has the non-constant modulus column vector of which the amplitude values of the elements are symmetrical or partially symmetrical, so that the non-constant modulus precoding matrix may adjust beam shape, antennas can focus power on a hotspot region, thus a load balance of the communication system may be effectively realized and the performance of the communication system may be improved.

BRIEF DESCRIPTION OF DRAWINGS

To illustrate the technical solutions provided in the embodiments of the present disclosure more clearly, a brief introduction on the accompanying drawings which are needed in the description of the embodiments will be given below. Apparently, the accompanying drawings in the description below are merely some of the embodiments of the present disclosure, based on which other drawings may be obtained by those skilled in the art without any inventive efforts.

DESCRIPTION OF EMBODIMENTS

A clear and complete description of technical solutions provided in the embodiments of the present disclosure will be given below, in conjunction with the accompanying drawings in the embodiments of the present disclosure. Apparently, the embodiments described below are merely a part, but not all, of the embodiments of the present disclosure. All of other embodiments, obtained by those skilled in the art based on the embodiments of the present disclosure without any inventive efforts, fall into the protection scope of the present disclosure.

It should be understood that, the technical solutions of the embodiments of the present disclosure may be applied to various communication systems, such as a global system of mobile communication (Global System of Mobile communication, "GSM" for short), a code division multiple access (Code Division Multiple Access, "CDMA" for short) system, a wideband code division multiple access (Wideband Code Division Multiple Access, "WCDMA" for short) system, a general packet radio service (General Packet Radio Service, "GPRS" for short) system, a long term evolution (Long Term Evolution, "LTE" for short) system, an LTE frequency division duplex (Frequency Division Duplex, "FDD" for short) system, an LTE time division duplex (Time Division Duplex, "TDD" for short) system, a universal mobile telecommunication system (Universal Mobile Telecommunication System, "UMTS" for short), a worldwide interoperability for microwave access (Worldwide Interoperability for Microwave Access, "WiMAX" for short) communication system and the like.

It should also be understood that, in the embodiments of the present disclosure, a user equipment (User Equipment, "UE" for short) may be referred to as a terminal (Terminal), a mobile station (Mobile Station, "MS" for short), a mobile terminal (Mobile Terminal) and the like, and may communicate with one or more core networks through a radio access network (Radio Access Network, "RAN" for short). For example, the user equipment may be a mobile phone (or referred to as a "cell" phone), a computer with a mobile terminal. For example, the user equipment may also be a portable, pocket-type, handheld, computer built-in or vehicle-mounted mobile device. The user equipment exchanges voice and/or data with the radio access network.

In the embodiments of the present disclosure, the base station may be a base transceiver station (Base Transceiver Station, "BTS" for short) in GSM or CDMA, or a NodeB (NodeB, "NB" for short) in WCDMA, or an evolved NodeB (Evolved Node B, "eNB or e-NodeB" for short) in LTE, which is not limited in the present disclosure. For the purpose of convenience in description, the eNB is taken as an example for illustrating in the following embodiments.

Figure 1:
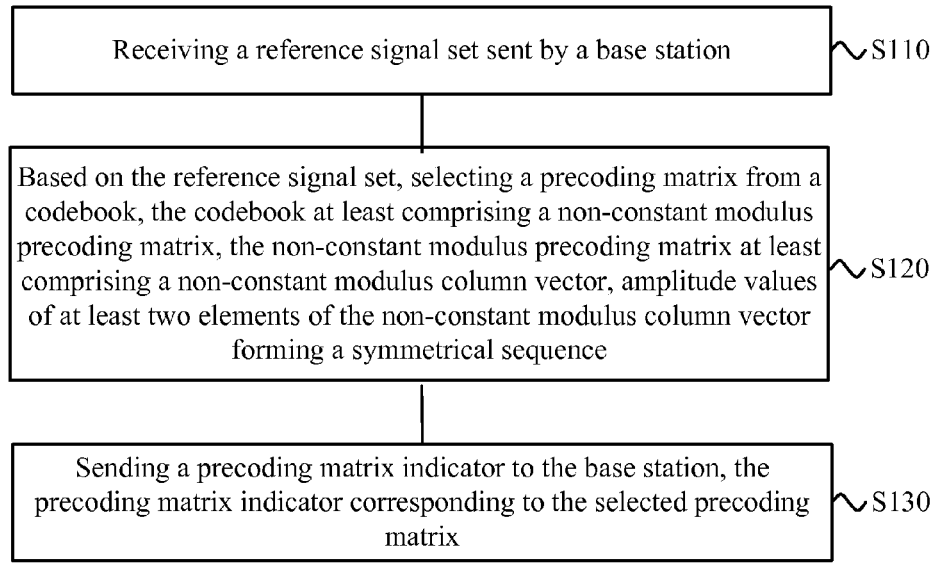
FIG. 1 is a schematic flow diagram of a method for determining a precoding matrix indicator according to an embodiment of the present disclosure.

FIG. 1 shows a method 100 for determining a precoding matrix indicator according to an embodiment of the present disclosure. The method 100 may be executed by a user equipment, for example, executed by a UE. The method 100 includes:

S110, receiving a reference signal set sent by a base station;

S120, based on the reference signal set, selecting a precoding matrix from a codebook, the codebook at least including a non-constant modulus precoding matrix, the non-constant modulus precoding matrix at least including a non-constant modulus column vector, and amplitude values of at least two elements of the non-constant modulus column vector forming a symmetrical sequence;

S130, sending a precoding matrix indicator to the base station, the precoding matrix indicator corresponding to the selected precoding matrix.

Therefore, according to the method for determining the precoding matrix indicator provided in the embodiment of the present disclosure, the precoding matrix is determined from the codebook with the non-constant modulus precoding matrix, and the non-constant modulus precoding matrix has the non-constant modulus column vector of which the amplitude values of the elements are symmetrical or partially symmetrical, so that the non-constant modulus precoding matrix may adjust beam shape, thus an antenna can focus power on a hotspot region, a load balance of a communication system may be effectively realized, and the performance of the communication system may be improved.

On the other hand, according to the method for determining the precoding matrix indicator provided in the embodiment of the present disclosure, the user equipment feeds back one or more precoding matrix indicators for indicating the precoding matrix based on the reference signal set, so that the channel correlation in time domain, frequency domain or spatial domain may be fully utilized, thus the feedback overhead may be remarkably reduced, and the performance of the communication system may be further improved.

In S110, the user equipment receives the reference signal set sent by the base station.

Specifically, the user equipment may receive a notification sent by the base station through high layer signaling or through a downlink control channel, the notification includes the reference signal set, and thus the user equipment can receive the reference signal set sent by the base station. For example, the base station may send the reference signal set to the user equipment through radio resource control (Radio Resource Control, "RRC" for short) signaling, or through a physical downlink control channel (Physical Downlink Control Channel, "PDCCH" for short), or through an enhanced PDCCH (enhanced PDCCH, "ePDCCH" for short).

The reference signal set may include one or more reference signals, and the reference signals may be cell-specific reference signals (Cell-specific Reference Signal, "CRS" for short) or channel state information-reference signals (Channel State Information-Reference Signal, "CSI-RS" for short).

It should be understood that, the reference signals may also be other reference signals, but the embodiments of the present disclosure are not limited thereto. It should also be understood that, in the embodiment of the present disclosure, the user equipment receiving the reference signal set sent by the base station may also be understood as the user equipment acquiring a reference signal port set.

In S120, the user equipment selects the precoding matrix from the codebook based on the reference signal set. The codebook at least includes a non-constant modulus precoding matrix, the non-constant modulus precoding matrix at least includes a non-constant modulus column vector, the amplitude values of part of elements or all of elements of the non-constant modulus column vector form a symmetrical sequence, and the length of the sequence is not smaller than 2 and not greater than the number of dimensions of the non-constant modulus column vector. The codebook will be described in detail below.

It is supposed that the non-constant modulus precoding matrix W at least included in the codebook has a structure as shown in the equation (1):

$$W=[w_1 w_2 \ldots w_r] \qquad (1)$$

Wherein, $w_j$ denotes the $j^{th}$ column vector of the non-constant modulus precoding matrix W, j is a natural number and $1 \leq j \leq r$, and r is the rank or the number of columns of the non-constant modulus precoding matrix W. It should be understood that, a constant modulus precoding matrix denotes a precoding matrix of which elements have the same amplitude; and the non-constant modulus precoding matrix denotes a precoding matrix of which not all elements have the same amplitude, namely in the non-constant modulus precoding matrix, at least one element has an amplitude different from the amplitudes of other elements.

The non-constant modulus precoding matrix W at least includes a non-constant modulus column vector $w_s$, s is a natural number and $1 \leq s \leq r$, and it is supposed that the non-constant modulus column vector $w_s$ has a structure as shown in the following equation (2):

$$w_s = [a_{1s} e^{j\theta_{1s}} a_{2s} e^{j\theta_{2s}} \ldots a_{(t-1)s} e^{j\theta_{(t-1)s}} a_{ts} e^{j\theta_{ts}}]^T \qquad (2)$$

Wherein, $[\ ]^T$ denotes the transposition operation of a matrix or a vector, $a_{ks}$ and $\theta_{ks}$ are respectively the amplitude and phase of the $k^{th}$ element of the non-constant modulus column vector $w_s$, k is a natural number and $1 \leq k \leq t$, and t is the number of dimensions of the non-constant modulus column vector $w_s$, namely the number of rows of the non-constant modulus precoding matrix W. Moreover, the phase in equation (2) may be derived from the phase of a precoding matrix designed in an existing constant modulus precoding codebook, for example, a codebook with 4 antennas or 8 antennas in the existing LTE system, which is not further redundantly described herein.

The amplitude values of all of or part of elements of the non-constant modulus column vector $w_s$ may form at least one symmetrical sequence A, and it is supposed that the sequence A has a structure as shown in the equation (3):

$$A = \{a_1, a_2, \ldots, a_M\} (a_i \in B) \qquad (3)$$

Wherein, $a_i$ is the $i^{th}$ element amplitude value of the sequence A, and i is a natural number and $1 \leq i \leq M$; the set B is a set formed by the amplitude values of the elements of the non-constant modulus column vector $w_s$; M is the length of the sequence, M is a natural number and $2 \leq M \leq t$; and t is the number of the elements of the set B.

Then, the symmetrical sequence A means that the sequence A satisfies the following equation (4) or (5):

$$a_1 = a_M, a_2 = a_{M-1}, \ldots, a_{M/2} = a_{(M/2)+1} \ (M \text{ is even}) \qquad (4)$$

$$a_1 = a_M, a_2 = a_{M-1}, \ldots, a_{(M-1)/2} = a_{(M+3)/2} \ (M \text{ is odd}) \qquad (5)$$

In the embodiment of the present disclosure, the non-constant modulus precoding matrix W may include one above-mentioned non-constant modulus column vector $w_s$ or two or more above-mentioned non-constant modulus column vectors $w_s$. Alternatively, the codebook at least includes a non-constant modulus precoding matrix, each column vector of the non-constant modulus precoding matrix is a non-constant modulus column vector, the amplitude values of elements of each non-constant modulus column vector form a symmetrical sequence, and the length of the sequence is not smaller than 2 and not greater than the number of dimensions of the non-constant modulus column vector.

In the embodiment of the present disclosure, the amplitude values of all elements of the above-mentioned non-constant modulus column vector may form a symmetrical sequence. For example, a sequence formed by the amplitude values of the elements of the non-constant modulus column vector $w_s$ in row order may have symmetrical property; and a sequence formed by the amplitude values of the elements of the non-constant modulus column vector $w_s$, after row permutation, may have symmetrical property.

For example, for a 6-dimensional non-constant modulus column vector $w_{s1}$, the amplitude values of which may form a sequence A1={1, 3, 2, 2, 3, 1} in row order, and the sequence A1 has symmetrical property. Thus, by adopting the precoding matrix including the non-constant modulus column vector, the distribution of power or energy of antennas may be adjusted, so that the power may be effectively focused on a hotspot region, and thus a load balance may be realized.

For another example, for a 6-dimensional non-constant modulus column vector $w_{s2}$, the amplitude values of which may form a sequence {1, 2, 3, 2, 3, 1} in row order, and a symmetrical sequence A1 may be formed according to a exchanged row order, after the $2^{nd}$ row of the non-constant modulus column vector $w_{s1}$ is exchanged with the $3^{rd}$ row. Similarly, by adopting the precoding matrix including the non-constant modulus column vector, the distribution of power or energy of antennas may be adjusted, so that the power may be effectively focused on a hotspot region, and thus a load balance may be realized.

In the embodiment of the present disclosure, the amplitude values of part of elements of the above-mentioned non-constant modulus column vector may also form a symmetrical sequence, for example, the sequence formed by the amplitude values of part of elements of the non-constant modulus column vector $w_s$ in row order or through row permutation may have symmetrical property.

For example, for a 7-dimensional non-constant modulus column vector $w_{s3}$, the sequence formed by the amplitude values of the vector in row order is {1, 3, 2, 2, 3, 1, 1.5}, and the amplitude values of part of elements of the vector may form a symmetrical sequence A1; for a 7-dimensional non-constant modulus column vector $w_{s4}$, the sequence formed by the amplitude values of the vector in row order is {1, 2, 3, 2, 3, 1, 1.5}, and the amplitude values of part of elements of the vector may also form a symmetrical sequence A1 after row permutation. Thus, by adopting the precoding matrix including the non-constant modulus column vector $w_{s3}$ or $w_{s4}$, the distribution of power or energy of antennas may be adjusted, so that the power may be effectively focused on a hotspot region, and a load balance may also be realized.

In the embodiment of the present disclosure, alternatively, the codebook at least includes a non-constant modulus precoding matrix, the non-constant modulus precoding matrix at least includes a non-constant modulus column vector, the amplitude values of the elements of the non-constant modulus column vector may be divided into at least two sets, the amplitude values of the elements of each of the at least two sets may form a symmetrical sequence, and the length of the sequence is not smaller than 2 and not greater than the number of dimensions of the non-constant modulus column vector.

For example, for a non-constant modulus column vector $w_{s5}$, the sequence formed by the amplitude values of the vector in row order is {1, 1.5, 3, 2, 1, 1.5, 1, 2}, the amplitude values of the elements of the non-constant modulus column vector may be divided into at least two sets B1 and B2, e.g. B1={1, 2, 3, 2, 1}, B2={1.5, 1, 1.5}. The sets B1 and B2 may form symmetrical sequence A2 and A3 respectively, wherein A2={1, 2, 3, 2, 1}, and A3={1.5, 1, 1.5}. Similarly, by adopting the precoding matrix including the non-constant modulus column vector $w_{s5}$, the distribution of power or energy of antennas may be adjusted, so that the power may be effectively focused on a hotspot region, and a load balance may also be realized.

Further, in the embodiment of the present disclosure, the amplitude values of the elements of the above-mentioned non-constant modulus column vector may be selected from a finite set, for example, the amplitude values of the elements are the products of the amplitudes of known modulation symbols (such as modulation symbols in 16QAM or 64QAM or 256QAM) and a common factor. The above-mentioned selection may reduce the implementation complexity that the UE selects the precoding matrix.

In S130, the user equipment sends the precoding matrix indicator corresponding to the selected precoding matrix to the base station.

Specifically, for example, the user equipment may send the precoding matrix indicator to the base station through a physical uplink control channel (Physical Uplink Control Channel, "PUCCH" for short) or a physical uplink shared channel (Physical Uplink Shared Channel, "PUSCH" for short).

It should be understood that, in the embodiment of the present disclosure, after the base station receives the precoding matrix indicator, the base station may determine a precoding matrix W according to the precoding matrix indicator and transmit a signal vector s according to the precoding matrix W. The user equipment may determine the signal vector s transmitted by the base station according to a received signal, the precoding matrix W and a channel matrix H or a precoded efficient channel HW, noise and interference n.

Therefore, according to the method for determining the precoding matrix indicator provided in the embodiment of the present disclosure, the precoding matrix is determined from the codebook with the non-constant modulus precoding matrix, and the non-constant modulus precoding matrix has the non-constant modulus column vector of which the amplitude values of the elements are symmetrical or partially symmetrical, so that the non-constant modulus precoding matrix may adjust beam shape, thus antennas may focus power on a hotspot region, a load balance of a communication system may be effectively realized, and the performance of the communication system may be improved.

In the embodiment of the present disclosure, alternatively, the sequence consisting of the amplitude values of the elements of the non-constant modulus column vector and having symmetrical property satisfies the following relationship (6) or (7):

$$\begin{cases} a_1 \le a_2 \le, \ldots, \le a_{M/2} \\ a_M \le a_{M-1} \le, \ldots, \le a_{(M/2)+1} \end{cases} (M \text{ is even}) \quad (6)$$

$$\begin{cases} a_1 \le a_2 \le, \ldots, \le a_{(M+1)/2} \\ a_M \le a_{M-1} \le, \ldots, \le a_{(M+1)/2} \end{cases} (M \text{ is odd}) \quad (7)$$

Wherein, M is the length of the sequence; and $a_i$ is the $i^{th}$ amplitude value of the sequence, i is a natural number and $1 \le i \le M$.

For example, for an 8-antenna non-constant modulus precoding matrix W, the amplitude values of the elements of a non-constant modulus column vector $w_s$ included in the non-constant modulus precoding matrix W may form a sequence A4 with symmetrical property, and A4={1, 1.5, 2, 2.5, 2.5, 2, 1.5, 1}. For another example, for a 10-antenna non-constant modulus precoding matrix W, the amplitude values of the elements of a non-constant modulus column vector $w_s$ may form a symmetrical sequence A5, and A5={1, 1.25, 1.5, 1.75, 2, 2, 1.75, 1.5, 1.25, 1}.

For another example, the amplitude values of the elements of the non-constant modulus column vector may be divided into at least two sets, and the amplitude values of the elements of each of the at least two sets may form a sequence with symmetrical property and satisfy the above relationship (6) or (7).

It should be understood that, in the embodiment of the present disclosure, alternatively, the sequence consisting of the amplitude values of the elements of the non-constant modulus column vector and having symmetrical property may also satisfy the following relationship (8) or (9):

$$\begin{cases} a_1 \geq a_2 \geq \ldots, \geq a_{M/2} \\ a_M \geq a_{M-1} \geq \ldots, \geq a_{(M/2)+1} \end{cases} \quad (M \text{ is even}) \tag{8}$$

$$\begin{cases} a_1 \geq a_2 \geq \ldots, \geq a_{(M+1)/2} \\ a_M \geq a_{M-1} \geq \ldots, \geq a_{(M+1)/2} \end{cases} \quad (M \text{ is odd}) \tag{9}$$

Wherein, M is the length of the sequence; and $a_i$ is the $i^{th}$ amplitude value of the sequence, i is a natural number and $1 \leq i \leq M$.

In the embodiment of the present disclosure, alternatively, the symmetrical sequence consisting of the amplitude values of the elements of the non-constant modulus column includes two symmetrical parts, and each symmetrical part is a geometric sequence or an arithmetic sequence.

Specifically, for example, the two symmetrical parts included in the symmetrical sequence are $a_1, a_2, \ldots, a_{M/2}$ and $a_M, a_{M-1}, \ldots, a_{(M/2)+1}$ respectively, wherein M is even, $a_1 = a_M, a_2 = a_{M-1}, \ldots, a_{M/2} = a_{(M/2)+1}$;

or the two symmetrical parts included in the symmetrical sequence are $a_1, a_2, \ldots a_{(M-1)/2}$ and $a_M, a_{M-1}, \ldots, a_{(M+3)/2}$ respectively, wherein M is odd, $a_1 = a_M, a_2 = a_{M-1}, \ldots, a_{(M-1)/2} = a_{(M+3)/2}$.

Each symmetrical part is a geometric sequence, namely the symmetrical part satisfies the following relationship:

$$\frac{a_1}{a_2} = \frac{a_2}{a_3} = \ldots = \frac{a_{(M/2)-1}}{a_{(M/2)}} \quad (M \text{ is even}) \tag{10}$$

or $$\frac{a_1}{a_2} = \frac{a_2}{a_3} = \ldots = \frac{a_{((M-1)/2)-1}}{a_{((M-1)/2)}} \quad (M \text{ is odd}) \tag{11}$$

It should be understood that the common ratio of the geometric sequence may be greater than 1, or smaller than 1, but not equal to 1.

It is easy to know that the corresponding other symmetrical part $a_M, a_{M-1}, \ldots, a_{(M/2)+1}$ or $a_M, a_{M-1}, \ldots, a_{(M+3)/2}$ is also a geometric sequence.

Each symmetrical part is an arithmetic sequence, namely the symmetrical part satisfies the following relationship:

$$a_1 - a_2 = a_2 - a_3 = \ldots = a_{(M/2)-1} - a_{(M/2)} \quad (M \text{ is even}) \tag{12}$$

or $$a_1 - a_2 = a_2 - a_3 = \ldots = a_{((M-1)/2)-1} - a_{((M-1)/2)} \quad (M \text{ is odd}) \tag{13}$$

It could be understood that the common difference of the arithmetic sequence may be greater than 0, or smaller than 0, but not equal to 0.

It is easy to know that the corresponding other symmetrical part $a_M, a_{M-1}, \ldots, a_{(M/2)+1}$ or $a_M, a_{M-1}, \ldots, a_{(M+3)/2}$ is also an arithmetic sequence.

In the embodiment of the present disclosure, alternatively, the non-constant modulus precoding matrix is the product of a diagonal matrix and a constant modulus matrix, wherein the diagonal element of the diagonal matrix consists of the amplitude values of elements of the non-constant modulus column vector.

Specifically, the non-constant modulus precoding matrix W may have a structure as shown in the following equation (14):

$$W = DU \tag{14}$$

Wherein, D is a diagonal matrix, and the diagonal elements of the diagonal matrix consist of the amplitude values of the elements of the non-constant modulus column vector $w_s$; and U is a constant modulus matrix.

For example, the diagonal matrix D and the constant modulus matrix U are as shown in the following equations (15)-(17) respectively:

$$D = \text{diag}\{ d_1 \quad d_2 \quad \ldots \quad d_{N/2} \quad d_{N/2+1} \quad d_{N/2+2} \quad \ldots \quad d_N \} \tag{15}$$

$$U = \begin{bmatrix} Y & Y \\ e^{j\varphi}Y & -e^{j\varphi}Y \end{bmatrix} \tag{16}$$

$$Y = [e^{j \cdot 0} \quad e^{j \cdot \theta} \quad \ldots \quad e^{j \cdot (N/2-1)\theta}]^T \tag{17}$$

Wherein, $$\varphi = \pm \frac{\pi}{2}, \pm \frac{\pi}{4}, \pm \frac{\pi}{8}, \ldots \quad ; \theta = \frac{\pi}{32}, \frac{\pi}{16}, \frac{\pi}{8}, \ldots .$$

Further, the diagonal element of the diagonal matrix in the equation (15) satisfies $$\sum_{i=1}^{\frac{N}{2}} d_i^2 = \sum_{i=\frac{N}{2}+1}^{N} d_i^2 \tag{18}$$

Through the structure of the precoding matrix in equations (15)-(18), columns of the precoding matrix are orthogonal with one another, so that inter-layer interference may be further reduced.

It should be understood that, in each embodiment of the present disclosure, the index of each above-mentioned procedure does not mean an execution sequence, and the execution order of each procedure should be determined by functions and internal logics thereof, rather than limiting the implementation procedure of the embodiment of the present disclosure.

Therefore, according to the method for determining the precoding matrix indicator provided in the embodiment of the present disclosure, the precoding matrix is determined from the codebook with the non-constant modulus precoding matrix, and the non-constant modulus precoding matrix has the non-constant modulus column vector of which the amplitude values of the elements are symmetrical or partially symmetrical, so that the non-constant modulus precoding matrix may adjust beam shape, thus antennas may focus power on a hotspot region, a load balance of a communication system may be effectively realized, and the performance of the communication system may be improved.

The method for determining the precoding matrix indicator according to the embodiment of the present disclosure is described in detail from the aspect of the user equipment above in combination with FIG. 1, and will be described from the aspect of the base station below in combination with FIG. 2.

Figure 2:
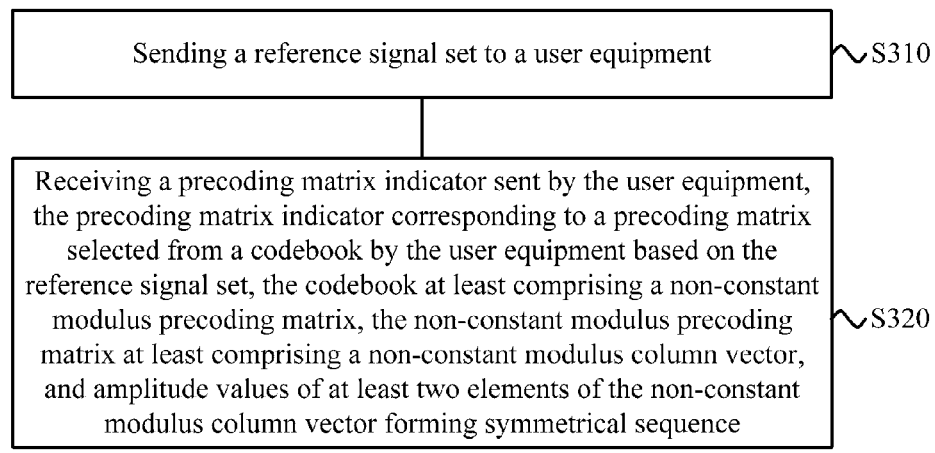
FIG. 2 is a schematic flow diagram of a method for determining a precoding matrix indicator according to another embodiment of the present disclosure.

As shown in FIG. 2, a method 300 for determining a precoding matrix indicator according to an embodiment of the present disclosure may be executed by a base station, for example, executed by an eNB. The method 300 includes:

S310, sending a reference signal set to a user equipment;

S320, receiving a precoding matrix indicator sent by the user equipment, the precoding matrix indicator corresponding to a precoding matrix selected from a codebook by the user equipment based on the reference signal set, the codebook at least including a non-constant modulus precoding matrix, the non-constant modulus precoding matrix at least including a non-constant modulus column vector, and amplitude values of at least two elements of the non-constant modulus column vector forming a symmetrical sequence.

Therefore, according to the method for determining the precoding matrix indicator provided in the embodiment of the present disclosure, the precoding matrix is determined from the codebook with the non-constant modulus precoding matrix, and the non-constant modulus precoding matrix has the non-constant modulus column vector of which the amplitude values of the elements are symmetrical or partially symmetrical, so that the non-constant modulus precoding matrix may adjust beam shape, thus antennas may focus power on a hotspot region, a load balance of a communication system may be effectively realized, and the performance of the communication system may be improved.

On the other hand, according to the method for determining the precoding matrix indicator provided in the embodiment of the present disclosure, the user equipment feeds back one or more precoding matrix indicators for indicating the precoding matrix based on the reference signal set, so that the channel correlation in time domain, or frequency domain or spatial domain may be fully utilized, thus the feedback overhead may be remarkably reduced, and the performance of the communication system may be further improved.

In the embodiment of the present disclosure, the sequence consisting of the amplitude values of the elements of the non-constant modulus column vector and having symmetrical property satisfies the following relationship:

$$\begin{cases} a_1 \le a_2 \le \ldots, \le a_{M/2} \\ a_M \le a_{M-1} \le \ldots, \le a_{(M/2)+1} \end{cases} (M \text{ is even}); \text{ or}$$

$$\begin{cases} a_1 \le a_2 \le \ldots, \le a_{(M+1)/2} \\ a_M \le a_{M-1} \le \ldots, \le a_{(M+1)/2} \end{cases} (M \text{ is odd})$$

Wherein, M is the length of the sequence; and $a_i$ is the $i^{th}$ amplitude value of the sequence, i is a natural number and $1 \le i \le M$.

In the embodiment of the present disclosure, alternatively, the symmetrical sequence consisting of the amplitude values of the elements of the non-constant modulus column vector includes two symmetrical parts, and each symmetrical part is a geometric sequence. Specifically, for example, each symmetrical part is described in (10) or (11). It should be understood that the common ratio of the geometric sequence may be greater than 1, or smaller than 1, but not equal to 1.

Alternatively, the symmetrical sequence consisting of the amplitude values of the elements of the non-constant modulus column vector includes two symmetrical parts, and each symmetrical part is an arithmetic sequence. Specifically, for example, each symmetrical part is described in (12) or (13).

It should be understood that the common difference of the arithmetic sequence may be greater than 0, or smaller than 0, but not equal to 0.

In the embodiment of the present disclosure, alternatively, the non-constant modulus precoding matrix is the product of a diagonal matrix and a constant modulus matrix, wherein the diagonal elements of the diagonal matrix consist of the amplitude values of elements of the non-constant modulus column vector. Specifically, for example, the non-constant modulus precoding matrix has a structure described in (14) to (18).

Further, in the embodiment of the present disclosure, the amplitude values of the elements of the non-constant modulus column vector may be selected from a finite set, for example, the amplitude values of the elements are the products of the amplitudes of known modulation symbols (such as modulation symbols in 16QAM or 64QAM or 256QAM) and a common factor. The above-mentioned selection may reduce the implementation complexity of the eNB precoding operation.

It should be understood that, the interaction, correlation, functions and the like of the UE and the eNB described on the eNB side correspond to those described on the UE side, which are not redundantly described herein for the purpose of briefness.

Therefore, according to the method for determining the precoding matrix indicator provided in the embodiment of the present disclosure, the precoding matrix is determined from the codebook with the non-constant modulus precoding matrix, and the non-constant modulus precoding matrix has the non-constant modulus column vector of which the amplitude values of the elements are symmetrical or partially symmetrical, so that the non-constant modulus precoding matrix may adjust beam shape, thus antennas may focus power in a hotspot region, a load balance of a communication system may be effectively realized, and the performance of the communication system may be improved.

The method for determining the precoding matrix indicator according to the embodiments of the present disclosure is described in detail above in combination with FIG. 1 and FIG. 2, and a user equipment and a base station according to the embodiments of the present disclosure will be described in detail below in combination with FIG. 3 and FIG. 4.

Figure 3:
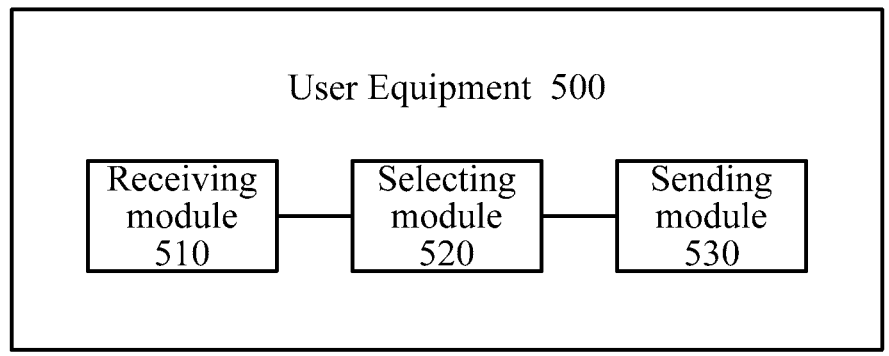
FIG. 3 is a schematic block diagram of a user equipment according to an embodiment of the present disclosure.

FIG. 3 shows a schematic block diagram of a user equipment 500 according to an embodiment of the present disclosure. As shown in FIG. 3, the user equipment 500 includes:

a receiving module 510, configured to receive a reference signal set sent by a base station;

a selecting module 520, configured to, based on the reference signal set received by the receiving module 510, select a precoding matrix from a codebook, the codebook at least including a non-constant modulus precoding matrix, the non-constant modulus precoding matrix at least including a non-constant modulus column vector, and amplitude values of at least two elements of the non-constant modulus column vector forming a symmetrical sequence; and a sending module 530, configured to send a precoding matrix indicator to the base station, the precoding matrix indicator corresponding to the precoding matrix selected by the selecting module 520.

Therefore, according to the user equipment of the embodiment of the present disclosure, the precoding matrix is determined from the codebook with the non-constant modulus precoding matrix, and the non-constant modulus precoding matrix has the non-constant modulus column vector of which the amplitude values of the elements are symmetrical or partially symmetrical, so that the non-constant modulus precoding matrix may adjust beam shape, thus antennas may focus power on a hotspot region, a load balance of a communication system may be effectively realized, and the performance of the communication system may be improved.

On the other hand, according to the method for determining the precoding matrix indicator provided in the embodiment of the present disclosure, the user equipment feeds back one or more precoding matrix indicators for indicating the precoding matrix based on the reference signal set, so that the channel correlation in time domain, frequency domain or spatial domain may be fully utilized, the feedback overhead may be remarkably reduced, and the performance of the communication system may be further improved.

In the embodiment of the present disclosure, the selecting module 520 selects the precoding matrix from the codebook, the codebook at least includes a non-constant modulus column vector, the non-constant modulus column vector at least includes a non-constant modulus column vector, and the symmetrical sequence consisting of the amplitude values of the elements of the non-constant modulus column vector satisfies the following relationship:

$$\begin{cases} a_1 \leq a_2 \leq, \ldots, \leq a_{M/2} \\ a_M \leq a_{M-1} \leq, \ldots, \leq a_{(M/2)+1} \end{cases} (M \text{ is even}); \text{ or}$$

$$\begin{cases} a_1 \leq a_2 \leq, \ldots, \leq a_{(M+1)/2} \\ a_M \leq a_{M-1} \leq, \ldots, \leq a_{(M+1)/2} \end{cases} (M \text{ is odd})$$

Wherein, M is the length of the sequence; and $a_i$ is the $i^{th}$ amplitude value of the sequence, i is a natural number and $1 \leq i \leq M$.

In the embodiment of the present disclosure, alternatively, the sequence consisting of the amplitude values of the elements of the non-constant modulus column vector and having symmetrical property includes two symmetrical parts, and each symmetrical part is a geometric sequence. Specifically, for example, each symmetrical part is described in (10) or (11). Specifically, for example, each symmetrical part is described in (12) or (13). It should be understood that the common ratio of the geometric sequence may be greater than 1, or smaller than 1, but not equal to 1.

Alternatively, the sequence consisting of the amplitude values of the elements of the non-constant modulus column vector and having symmetrical property includes two symmetrical parts, and each symmetrical part is an arithmetic sequence. Specifically, for example, each symmetrical part is described in (12) or (13). It should be understood that the common difference of the arithmetic sequence may be greater than 0, or smaller than 0, but not equal to 0.

In the embodiment of the present disclosure, alternatively, the non-constant modulus precoding matrix is the product of a diagonal matrix and a constant modulus matrix, wherein the diagonal element of the diagonal matrix consists of the amplitude values of elements of the non-constant modulus column vector. Specifically, for example, the non-constant modulus precoding matrix has a structure described in (14) to (18).

Further, in the embodiment of the present disclosure, the amplitude values of the elements of the non-constant modulus column vector may be selected from a finite set, for example, the amplitude values of the elements are the products of the amplitudes of known modulation symbols (such as modulation symbols in 16QAM or 64QAM or 256QAM) and a common factor. The above-mentioned selection may reduce the implementation complexity of the eNB precoding operation.

The user equipment 500 according to the embodiment of the present disclosure may correspond to the UE in the embodiment of the present disclosure, and the above-mentioned and other operations and/or functions of modules in the user equipment 500 are to realize the corresponding flow of the method 100 in FIG. 1, which is not redundantly described herein for the purpose of briefness.

Therefore, according to the user equipment of the embodiment of the present disclosure, the precoding matrix is determined from the codebook with the non-constant modulus precoding matrix, and the non-constant modulus precoding matrix has the non-constant modulus column vector of which the amplitude values of the elements are symmetrical or partially symmetrical, so that the non-constant modulus precoding matrix may adjust beam shape, thus antennas may focus power on a hotspot region, a load balance of a communication system may be effectively realized, and the performance of the communication system may be improved.

Figure 4:
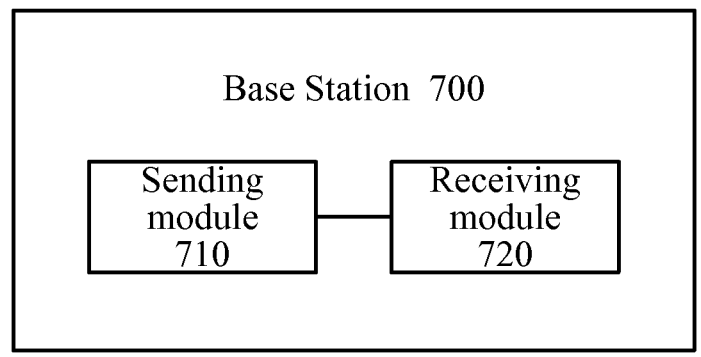
FIG. 4 is a schematic block diagram of a base station according to an embodiment of the present disclosure.

FIG. 4 shows a schematic block diagram of a base station 700 according to an embodiment of the present disclosure. As shown in FIG. 4, the base station 700 includes:

a sending module 710, configured to send a reference signal set to a user equipment;

a receiving module 720, configured to receive a precoding matrix indicator sent by the user equipment, the precoding matrix indicator corresponding to a precoding matrix selected from a codebook by the user equipment based on the reference signal set, the codebook at least including a non-constant modulus precoding matrix, the non-constant modulus precoding matrix at least including a non-constant modulus column vector, and amplitude values of at least two elements of the non-constant modulus column vector forming a symmetrical sequence.

In the embodiment of the present disclosure, alternatively, the symmetrical sequence consisting of the amplitude values of the elements of the non-constant modulus column vector satisfies the following relationship:

$$\begin{cases} a_1 \leq a_2 \leq, \ldots, \leq a_{M/2} \\ a_M \leq a_{M-1} \leq, \ldots, \leq a_{(M/2)+1} \end{cases} (M \text{ is even}); \text{ or}$$

$$\begin{cases} a_1 \leq a_2 \leq, \ldots, \leq a_{(M+1)/2} \\ a_M \leq a_{M-1} \leq, \ldots, \leq a_{(M+1)/2} \end{cases} (M \text{ is odd})$$

Wherein, M is the length of the sequence; and $a_i$ is the $i^{th}$ amplitude value of the sequence, i is a natural number and $1 \leq i \leq M$.

In the embodiment of the present disclosure, alternatively, the sequence consisting of the amplitude values of the elements of the non-constant modulus column vector and having symmetrical property includes two symmetrical parts, and each symmetrical part is a geometric sequence. Specifically, for example, each symmetrical part is described in (10) or (11). It should be understood that the common ratio of the geometric sequence may be greater than 1, or smaller than 1, but not equal to 1.

Alternatively, the symmetrical sequence consisting of the amplitude values of the elements of the non-constant modulus column vector includes two symmetrical parts, and each symmetrical part is an arithmetic sequence. Specifically, for example, each symmetrical part is described in (12) or (13).

It should be understood that the common difference of the arithmetic sequence may be greater than 0, or smaller than 0, but not equal to 0.

In the embodiment of the present disclosure, alternatively, the non-constant modulus precoding matrix is the product of a diagonal matrix and a constant modulus matrix, wherein the diagonal elements of the diagonal matrix consist of the amplitude values of elements of the non-constant modulus column vector. Specifically, for example, the non-constant modulus precoding matrix has a structure described in (14) to (18).

Further, in the embodiment of the present disclosure, the amplitude values of the elements of the non-constant modulus column vector may be selected from a finite set, for example, the amplitude values of the elements are the products of the amplitudes of known modulation symbols (such as modulation symbols in 16QAM or 64QAM or 256QAM) and a common factor. The above-mentioned selection may reduce the implementation complexity of the eNB precoding operation.

The base station 700 according to the embodiment of the present disclosure may correspond to the base station eNB provided in the embodiment of the present disclosure, and the above-mentioned and other operations and/or functions of modules in the base station 700 are to realize the corresponding flow of the method 300 in FIG. 2, which is not redundantly described herein for the purpose of briefness.

Therefore, according to the base station of the embodiment of the present disclosure, the precoding matrix is determined from the codebook with the non-constant modulus precoding matrix, and the non-constant modulus precoding matrix has the non-constant modulus column vector of which the amplitude values of the elements are symmetrical or partially symmetrical, so that the non-constant modulus precoding matrix may adjust beam shape, thus antennas may focus power on a hotspot region, a load balance of a communication system may be effectively realized, and the performance of the communication system may be improved.

In addition, the terms "system" and "network" may be exchanged with each other for use herein. The term "and/or" herein is merely a correlation for describing associated objects, and denotes that three relations may exist. For example, A and/or B may denote three conditions that A exists alone, A and B coexist, and B exists alone. In addition, the symbol "/" herein generally denotes an "or" relation of the front and back associated objects.

It should be understood that, in the embodiments of the present disclosure, "B corresponding to A" denotes that B is associated with A and may be determined according to A. It should also be understood that, determining B according to A does not mean that B is determined only according to A, and B may also be determined according to A and/or other information.

Those skilled in the art may realize that the units and algorithmic steps of the examples described in conjunction with the embodiments disclosed in the present disclosure may be realized by electronic hardware or computer software or the combination of computer software and electronic hardware. In order to clearly illustrate the interchangeability of hardware and software, the composition and steps of each example are already generally described according to functions in the above-mentioned description. Whether these functions are executed in a hardware or software mode depends on the specific applications and design constraint conditions of the technical solution. For each specific application, the described functions may be realized by professionals using different methods, but this realization shall not be considered as going beyond the scope of the present disclosure.

Those skilled in the art to which the present disclosure pertains may clearly understand that, for the purpose of convenience and briefness in description, for the specific working processes of the above-described systems, devices and units, reference could be made to the corresponding processes in the embodiments of the aforementioned methods, and repeated description is not given here.

In the several embodiments provided by the present application, it should be understood that the disclosed systems, devices and methods may be realized in other modes. For example, the embodiments of the above-described devices are only exemplary, for example, the division of the units is only a logic function division, other division modes may be adopted in practice, e.g., a plurality of units or components may be combined or integrated in another system, or some features may be omitted or are not executed. In addition, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on a plurality of network units. The objectives of the solutions of the embodiments of the present disclosure may be fulfilled by selecting part of or all of the units according to actual needs.

In addition, in various embodiments of the present disclosure, the functional units may be integrated in one processing unit, or the function units may separately and physically exist, or two or more units may be integrated in one unit. The integrated unit may be realized in the form of hardware or in the form of software functional units.

When the integrated unit is realized in the form of software functional units and sold or used as independent products, the integrated unit may be stored in a computer-readable storage medium. Based on such an understanding, the technical solution of the present disclosure substantially, or the part of the present disclosure making contribution to the prior art, or all or a part of the technical solution may be embodied in the form of a software product, and the computer software product is stored in a storage medium, which includes a plurality of instructions enabling computer equipment (which may be a personal computer, a server, or network equipment and the like) to execute all of or part of the steps in the methods of the embodiments of the present disclosure. The aforementioned storage medium includes various media capable of storing program codes, such as a U disk, a mobile hard disk, a read-only memory (ROM, Read-Only Memory), a random access memory (RAM, Random Access Memory), a disk or an optical disk.

The above description is merely the specific embodiments of the present disclosure, but the protection scope of the present disclosure is not limited thereto, any skilled who is familiar with this art could readily conceive variations or substitutions within the disclosed technical scope disclosed by the present disclosure, and these variations or substitutions shall be encompassed in the protection scope of the present disclosure. Thus, the protection scope of the present disclosure shall be subjected to the protection scope of the claims.

What is claimed is:

1. A method for determining a precoding matrix indicator, the method comprising:
receiving a reference signal set sent by a base station through high layer signaling or through a downlink control channel;
based on the reference signal set, selecting a precoding matrix from a codebook, the codebook comprising a non-constant modulus precoding matrix, the non-constant modulus precoding matrix comprising a non-constant modulus column vector, wherein amplitude values of at least two elements of the non-constant modulus column vector form a symmetrical sequence, wherein the non-constant modulus precoding matrix is a product of a diagonal matrix and a constant modulus matrix, and diagonal elements of the diagonal matrix include amplitude values of elements of the non-constant modulus column vector; and
sending a precoding matrix indicator to the base station, the precoding matrix indicator corresponding to the selected precoding matrix.

2. The method according to claim 1, wherein the symmetrical sequence satisfies one of the following relationships:

$$\begin{cases} a_1 \leq a_2 \leq, \ldots, \leq a_{M/2} \\ a_M \leq a_{M-1} \leq, \ldots, \leq a_{(M/2)+1} \end{cases} (M \text{ is even}); \text{ and}$$

$$\begin{cases} a_1 \leq a_2 \leq, \ldots, \leq a_{(M+1)/2} \\ a_M \leq a_{M-1} \leq, \ldots, \leq a_{(M+1)/2} \end{cases} (M \text{ is odd});$$

wherein, M is a length of the sequence; and $a_i$ is a $i^{th}$ element amplitude value of the sequence, i is a natural number and $1 \leq i \leq M$.

3. The method according to claim 1, wherein the symmetrical sequence comprises two symmetrical parts, wherein each of said two symmetrical parts is a geometric sequence.

4. The method according to claim 1, wherein the symmetrical sequence comprises two symmetrical parts, wherein each of said two symmetrical parts is an arithmetic sequence.

5. A method for determining a precoding matrix indicator, the method comprising:
sending a reference signal set to a user equipment through high layer signaling or through a downlink control channel;
receiving a precoding matrix indicator sent by the user equipment, the precoding matrix indicator corresponding to a precoding matrix selected from a codebook by the user equipment based on the reference signal set, the codebook comprising a non-constant modulus precoding matrix, the non-constant modulus precoding matrix comprising a non-constant modulus column vector, wherein amplitude values of at least two elements of the non-constant modulus column vector form a symmetrical sequence, wherein the non-constant modulus precoding matrix is a product of a diagonal matrix and a constant modulus matrix, and diagonal elements of the diagonal matrix include amplitude values of elements of the non-constant modulus column vector.

6. The method according to claim 5, wherein the symmetrical sequence satisfies one of the following relationships:

$$\begin{cases} a_1 \leq a_2 \leq, \ldots, \leq a_{M/2} \\ a_M \leq a_{M-1} \leq, \ldots, \leq a_{(M/2)+1} \end{cases} (M \text{ is even}); \text{ and}$$

$$\begin{cases} a_1 \leq a_2 \leq, \ldots, \leq a_{(M+1)/2} \\ a_M \leq a_{M-1} \leq, \ldots, \leq a_{(M+1)/2} \end{cases} (M \text{ is odd});$$

wherein, M is a length of the sequence; and $a_i$ is a $i^{th}$ element amplitude value of the sequence, i is a natural number and $1 \leq i \leq M$.

7. The method according to claim 5, wherein the symmetrical sequence comprises two symmetrical parts, wherein each of said two symmetrical parts is a geometric sequence.

8. The method according to claim 5, wherein the symmetrical sequence comprises two symmetrical parts, wherein each of said two symmetrical parts is an arithmetic sequence.

9. A user equipment comprising:
a receiver configured to receive a reference signal set sent by a base station through high layer signaling or through a downlink control channel;
a processor configured to, based on the reference signal set received by the receiver select a precoding matrix from a codebook, the codebook comprising a non-constant modulus precoding matrix, the non-constant modulus precoding matrix comprising a non-constant modulus column vector, wherein amplitude values of at least two elements of the non-constant modulus column vector form a symmetrical sequence, wherein the non-constant modulus precoding matrix is a product of a diagonal matrix and a constant modulus matrix, and diagonal elements of the diagonal matrix include amplitude values of elements of the non-constant modulus column vector; and
a transmitter configured to send a precoding matrix indicator to the base station, the precoding matrix indicator corresponding to the precoding matrix selected by the processor.

10. The user equipment according to claim 9, wherein the symmetrical sequence satisfies one of the following relationships:

$$\begin{cases} a_1 \leq a_2 \leq, \ldots, \leq a_{M/2} \\ a_M \leq a_{M-1} \leq, \ldots, \leq a_{(M/2)+1} \end{cases} (M \text{ is even}); \text{ and}$$

$$\begin{cases} a_1 \leq a_2 \leq, \ldots, \leq a_{(M+1)/2} \\ a_M \leq a_{M-1} \leq, \ldots, \leq a_{(M+1)/2} \end{cases} (M \text{ is odd});$$

wherein, M is a length of the sequence; and $a_i$ is a $i^{th}$ element amplitude value of the sequence, i is a natural number and $1 \leq i \leq M$.

11. The user equipment according to claim 9, wherein the symmetrical sequence comprises two symmetrical parts, wherein each of said two symmetrical parts is a geometric sequence.

12. The user equipment according to claim 9, wherein the symmetrical sequence comprises two symmetrical parts, wherein each of said two symmetrical parts is an arithmetic sequence.

13. A base station comprising:
a transmitter configured to send a reference signal set to a user equipment through high layer signaling or through a downlink control channel;
a receiver configured to receive a precoding matrix indicator sent by the user equipment, the precoding matrix indicator corresponding to a precoding matrix selected from a codebook by the user equipment based on the reference signal set, the codebook comprising a non-constant modulus precoding matrix, the non-constant modulus precoding matrix comprising a non-constant modulus column vector, wherein amplitude values of at least two elements of the non-constant modulus column vector forming a symmetrical sequence, wherein the non-constant modulus precoding matrix is a product of a diagonal matrix and a constant modulus matrix, and diagonal elements of the diagonal matrix include amplitude values of elements of the non-constant modulus column vector.

14. The base station according to claim 13, wherein the symmetrical sequence satisfies one of the following relationships:

$$\begin{cases} a_1 \leq a_2 \leq, \ldots, \leq a_{M/2} \\ a_M \leq a_{M-1} \leq, \ldots, \leq a_{(M/2)+1} \end{cases} (M \text{ is even}); \text{ and}$$

$$\begin{cases} a_1 \leq a_2 \leq, \ldots, \leq a_{(M+1)/2} \\ a_M \leq a_{M-1} \leq, \ldots, \leq a_{(M+1)/2} \end{cases} (M \text{ is odd});$$

wherein, M is a length of the sequence; and $a_i$ is a $i^{th}$ element amplitude value of the sequence, i is a natural number and $1 \leq i \leq M$.

15. The base station according to claim 13, wherein the symmetrical sequence comprises two symmetrical parts, wherein each of the two symmetrical parts is a geometric sequence.

16. The base station according to claim 13, wherein the symmetrical sequence comprises two symmetrical parts, wherein each of the two symmetrical parts is an arithmetic sequence.

17. A non-transitory, computer-readable medium storing instructions that, when executed by a computer, cause the computer to perform the method of:

receiving a reference signal set sent by a base station through high layer signaling or through a downlink control channel;
selecting a precoding matrix from a codebook based on the received reference signal set,
wherein (a) the codebook comprising a non-constant modulus precoding matrix that includes a non-constant modulus column vector, (b) amplitude values of at least two elements of the non-constant modulus column vector form a symmetrical sequence, (c) the non-constant modulus precoding matrix is a product of a diagonal matrix and a constant modulus matrix, and (d) diagonal elements of the diagonal matrix include amplitude values of elements of the non-constant modulus column vector; and
sending a precoding matrix indicator to the base station, where the precoding matrix indicator corresponds to the selected precoding matrix.

18. The non-transitory, computer-readable medium according to claim 17, wherein the symmetrical sequence satisfies one of the following relationships:

$$\begin{cases} a_1 \leq a_2 \leq, \ldots, \leq a_{M/2} \\ a_M \leq a_{M-1} \leq, \ldots, \leq a_{(M/2)+1} \end{cases} (M \text{ is even}); \text{ and}$$

$$\begin{cases} a_1 \leq a_2 \leq, \ldots, \leq a_{(M+1)/2} \\ a_M \leq a_{M-1} \leq, \ldots, \leq a_{(M+1)/2} \end{cases} (M \text{ is odd});$$

wherein, M is a length of the sequence; and $a_i$ is a $i^{th}$ element amplitude value of the sequence, i is a natural number and $1 \leq i \leq M$.

19. The non-transitory, computer-readable medium according to claim 17, wherein the symmetrical sequence comprises two symmetrical parts, wherein each of said two symmetrical parts is a geometric sequence.

20. The non-transitory, computer-readable medium according to claim 17, wherein the symmetrical sequence comprises two symmetrical parts, wherein each of said two symmetrical parts is an arithmetic sequence.

* * * * *